(12) United States Patent
Wu et al.

(10) Patent No.: US 12,435,152 B2
(45) Date of Patent: *Oct. 7, 2025

(54) HUMANIZED BCMA ANTIBODY AND BCMA-CAR-T CELLS

(71) Applicant: Caribou Biosciences, Inc., Berkeley, CA (US)

(72) Inventors: Lijun Wu, Berkeley, CA (US); Vita Golubovskaya, Richmond, CA (US)

(73) Assignee: Caribou Biosciences, Inc., Berkeley, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/930,662

(22) Filed: Sep. 8, 2022

(65) Prior Publication Data

US 2024/0182591 A1 Jun. 6, 2024

Related U.S. Application Data

(63) Continuation of application No. 17/700,160, filed on Mar. 21, 2022, now Pat. No. 11,472,884, which is a continuation of application No. 17/493,386, filed on Oct. 4, 2021, now Pat. No. 11,299,549, which is a continuation of application No. 17/327,232, filed on May 21, 2021, now Pat. No. 11,142,583, which is a continuation of application No. 17/148,487, filed on Jan. 13, 2021, now Pat. No. 11,021,542, which is a continuation of application No. 17/010,798, filed on Sep. 2, 2020, now Pat. No. 10,927,182, which is a continuation of application No. PCT/US2020/013662, filed on Jan. 15, 2020.

(51) Int. Cl.

| *A61P 35/00* | (2006.01) |
|---|---|
| *A61K 9/00* | (2006.01) |
| *A61K 40/11* | (2025.01) |
| *A61K 40/31* | (2025.01) |
| *A61K 40/42* | (2025.01) |
| *C07K 14/705* | (2006.01) |
| *C07K 14/725* | (2006.01) |
| *C07K 16/28* | (2006.01) |
| *C12N 5/0783* | (2010.01) |
| *A61K 35/12* | (2015.01) |
| *A61K 38/00* | (2006.01) |
| *A61K 39/00* | (2006.01) |

(52) U.S. Cl.
CPC ........ *C07K 16/2878* (2013.01); *A61K 9/0019* (2013.01); *A61K 40/11* (2025.01); *A61K 40/31* (2025.01); *A61K 40/4215* (2025.01); *A61P 35/00* (2018.01); *C07K 14/7051* (2013.01); *C07K 14/70517* (2013.01); *C07K 14/70578* (2013.01); *C12N 5/0636* (2013.01); *C12N 5/0646* (2013.01); *A61K 2035/124* (2013.01); *A61K 38/00* (2013.01); *A61K 2039/505* (2013.01); *A61K 2039/54* (2013.01); *A61K 2239/31* (2023.05); *A61K 2239/46* (2023.05); *C07K 2317/24* (2013.01); *C07K 2317/622* (2013.01); *C07K 2317/76* (2013.01); *C07K 2319/02* (2013.01); *C07K 2319/03* (2013.01); *C07K 2319/30* (2013.01); *C07K 2319/33* (2013.01); *C12N 2510/00* (2013.01)

(58) Field of Classification Search
None
See application file for complete search history.

(56) References Cited

U.S. PATENT DOCUMENTS 11,472,884 B2 * 10/2022 Wu .................... C12N 5/0636

FOREIGN PATENT DOCUMENTS

| CN | 108373504 A | 8/2018 |
|---|---|---|
| CN | 109069537 A | 12/2018 |
| CN | 109069537 B | 4/2022 |
| CN | 108373504 B | 6/2022 |
| JP | 2017-527271 A2 | 9/2017 |
| RU | 274904 | 6/2021 |
| WO | 2013154760 A1 | 10/2013 |
| WO | WO2015166073 A1 | 11/2015 |
| WO | WO2016014565 A2 | 1/2016 |
| WO | 2017130223 | 8/2017 |
| WO | WO2017176525 A1 | 10/2017 |
| WO | WO2021119006 A1 | 6/2021 |

OTHER PUBLICATIONS

U.S. Appl. No. 17/010,798, filed Sep. 2, 2020, U.S. Pat. No. 10,927,182, Feb. 23, 2021, Granted.
U.S. Appl. No. 17/148,487, filed Jan. 13, 2021, U.S. Pat. No. 11,021,542, Jun. 1, 2021, Granted.
U.S. Appl. No. 17/327,232, filed May 21, 2021, U.S. Pat. No. 11,142,583, Oct. 12, 2021, Granted.
U.S. Appl. No. 17/493,386, filed Oct. 4, 2021, U.S. Pat. No. 11,299,549, Apr. 12, 2022, Granted.
U.S. Appl. No. 17/700,160, filed Mar. 21, 2022, Allowed.
PCT/US2020/013662, Jan. 15, 2020, Published.
Berahovich Robert, et al., "CAR-T Cells Based on Novel BCMA Monoclonal Antibody Block Multiple Myeloma Cell Growth," Cancers (Basel), vol. 10, No. 9, Sep. 11, 2018, p. 323.

* cited by examiner

*Primary Examiner* — Zachary S Skelding
(74) *Attorney, Agent, or Firm* — Barbara G. McClung

(57) ABSTRACT

The present invention is directed to a humanized BCMA single-chain variable fragment (scFv), comprising $V_H$ having the amino acid sequence of SEQ ID NO: 3 and $V_L$ having the amino acid sequence of SEQ ID NO: 5. The present invention is also directed to a BCMA chimeric antigen receptor fusion protein comprising from N-terminus to C-terminus: (i) a single-chain variable fragment (scFv) of the present invention, (ii) a transmembrane domain, (iii) at least one co-stimulatory domains, and (iv) an activating domain. This humanized BCMA-CAR-T cells have specific killing activity against BCMA-positive tumor cells.

18 Claims, 10 Drawing Sheets
Specification includes a Sequence Listing.

```
        10          20          30          40          50
MLQMAGQCSQ  NEYFDSLLHA  CIPCQLRCSS  NTPPLTCQRY  CNASVTNSVK
        60          70          80          90         100
GTNAILWTCL  GLSLIISLAV  FVLMFLLRKI  NSEPLKDEFK  NTGSGLLGMA
       110         120         130         140         150
NIDLEKSRTG  DEIILPRGLE  YTVEECTCED  CIKSKPKVDS  DHCFPLPAME
       160         170         180
EGATILVTTK  TNDYCKSLPA  ALSATEIEKS  ISAR
```

HUMANIZED BCMA ANTIBODY AND BCMA-CAR-T CELLS

This application is a continuation of U.S. patent application Ser. No. 17/700,160, filed on 21 Mar. 2022, now allowed, which is a continuation of U.S. patent application Ser. No. 17/493,386, filed on 4 Oct. 2021, now U.S. Pat. No. 11,299,549, which is a continuation of U.S. patent application Ser. No. 17/327,232, filed on 21 May 2021, now U.S. Pat. No. 11,142,583, which is a continuation of U.S. patent application Ser. No. 17/148,487, filed 13 Jan. 2021, now U.S. Pat. No. 11,021,542, which is a divisional of U.S. patent application Ser. No. 17/010,798, filed 2 Sep. 2020, now U.S. Pat. No. 10,927,182, which is a continuation under 35 U.S.C. § 111 (a) of PCT Patent Application No. PCT/US2020/013662, filed 15 Jan. 2020, now pending, which claims the benefit of and priority to U.S. Provisional Application No. 62/793,274, filed 16 Jan. 2019, all of which applications are incorporated herein by reference in their entireties.

REFERENCE TO SEQUENCE LISTING, TABLE OR COMPUTER PROGRAM

The sequences referred to herein are listed in the Sequence Listing submitted as an ASCII text file entitled "CBI038-12_ST25.txt"—16 KB, which was created on 21 May 2021. The Sequence Listing entitled "CBI038-12) ST25.txt" is incorporated herein by reference in its entirety.

FIELD OF THE INVENTION

The present invention relates to humanized BCMA antibody (PMC306) and BCMA-CAR-T cells specifically decreasing multiple myeloma tumor growth, which are useful in the field of adoptive immunity gene therapy for tumors.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug") [1, 2].

CARs typically consist of a monoclonal antibody-derived single-chain variable fragment (scFv) at the N-terminal part, hinge, transmembrane domain and a number of intracellular co-activation domains: (i) CD28, (ii) CD137 (4-1BB), CD27, or other co-stimulatory domains, in tandem with an activation CD3-zeta domain (FIG. 1). The evolution of CARs went from first generation (with no co-stimulation domains) to second generation (with one co-stimulation domain) to third generation CAR (with several co-stimulation domains). Generating CARs with two costimulatory domains (the so-called $3^{rd}$ generation CAR) have led to increased cytolytic CAR-T cell activity, improved persistence of CAR-T cells leading to its augmented antitumor activity.

BCMA

B cell maturation antigen (BCMA) is a cell surface receptor, also known as CD269 and tumor necrosis factor receptor superfamily member 17 (TNFRSF17), that is encoded by TNFRSF17 gene. This receptor is expressed mainly in mature B lymphocytes and in most cases overexpressed in multiple myeloma (MM) [4]. Current therapies to target BCMA in MM include monoclonal antibodies, bi-specific antibodies and T cellular immunotherapies, CAR-T therapies [4, 5].

The human BCMA protein consists of 184 amino-acids: 1-54-extracellular domain; 55-77-transmembrane domain; 78-184-cytoplasmic domain. The amino-acid sequence of BCMA is shown on FIG. 2. BCMA lacks signaling peptide and resembles other receptors BAFF Receptor and transmembrane activator and cyclophilin ligand interactor and calcium modulator (TACI) [4]. These receptors play major role in B cell maturation and differentiation into plasma cells. Their ligands include BAFF and APRIL which expression is increase in MM patients [4].

BRIEF DESCRIPTION OF THE DRAWINGS

FIG. 5A shows CHO-BCMA target cells. on the right: From top to bottom: Mock CAR-T cells, T cells, target cells alone, and humanized CAR-T cells. FIG. 5B shows CHO target cells. From top to bottom on the right, Mock CAR-T cells, humanized BCMA CAR-T cells, T cells, and target cells alone.

DETAILED DESCRIPTION OF THE INVENTION

Definitions

Figures 1, 2:
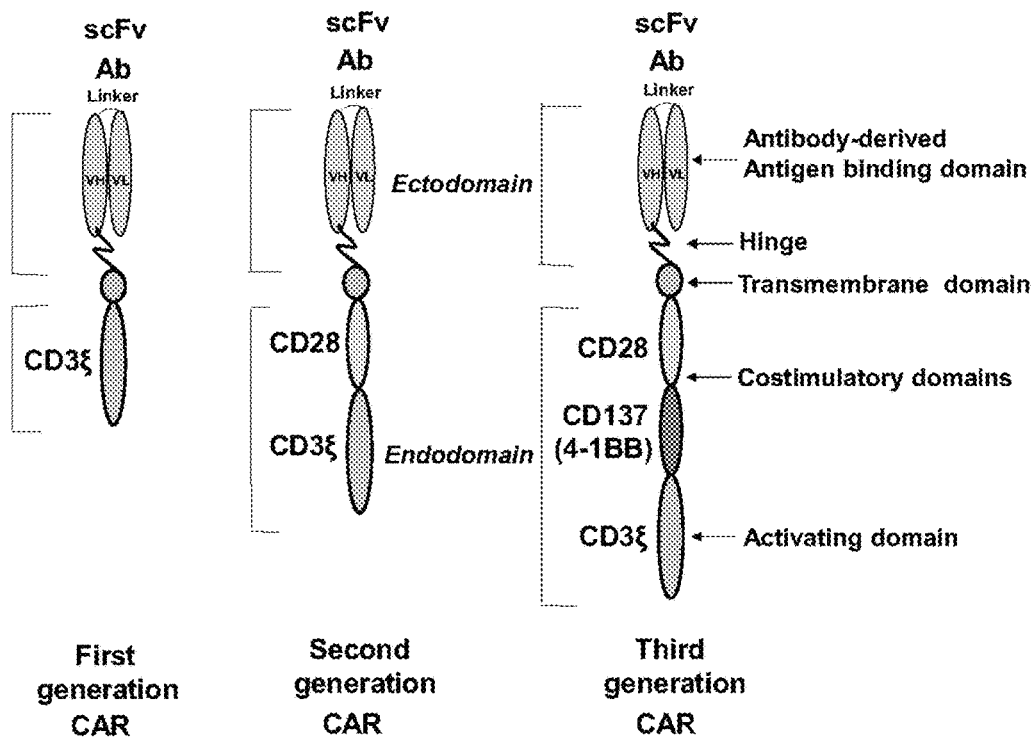
FIG. 1 shows the structures of CAR [3]. The left panel shows the structure of first generation (no costimulatory domains). The middle panel shows the structure of the second generation (one co-stimulation domain of CD28 or 4-1B). The right panel shows the structure of the third generation (two or more co-stimulation domains).
FIG. 2 shows the amino-acid sequence of BCMA protein (SEQ ID NO: 1). Extracellular domain is underlined.

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, a "domain" means one region in a polypeptide which is folded into a particular structure independently of other regions.

As used herein, "humanized antibodies" are antibodies derived from non-human species whose protein sequences have been modified to increase their similarity to antibody variants produced naturally in humans. For example, after a mouse antibody is developed, the DNA coding for that antibody can be sequenced. The DNA sequence corresponding to the antibody CDRs can then be determined. The CDR sequences can be inserted into a construct containing the DNA for a human antibody variant to prepare humanized antibodies.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The inventors have engineered humanized BCMA scFv starting from heavy and light chain variable regions of mouse monoclonal antibody derived from a mouse monoclonal antibody, clone 4C8A. Mouse 4C8A antibody exhibits strong and selective binding to human BCMA [6]. The inventors have produced BCMA-CAR-T cells based on humanized BCMA antibody to target cancer cells overexpressing BCMA tumor antigen. The BCMA-CAR-T cells of the present invention have high cytotoxic activity against several cancer cell lines.

The present invention is directed to a humanized anti-human BCMA antibody comprising $V_H$ having the amino acid of SEQ ID NO: 3 and $V_L$ having the amino acid of SEQ ID NO: 5.

In one embodiment, the humanized anti-human BCMA antibody is a single-chain variable fragment (scFv). ScFv can be $V_H$-linker-$V_L$ or $V_L$-linker-$V_H$.

The present invention is also directed to a chimeric antigen receptor fusion protein comprising from N-terminus to C-terminus: (i) a single-chain variable fragment (scFv) against BCMA in which $V_H$ has the amino acid sequence of SEQ ID NO 3, and $V_L$ has the amino acid of SEQ ID NO: 5, (ii) a transmembrane domain, (iii) at least one co-stimulatory domains, and (iv) an activating domain.

In one embodiment, the CAR structure is shown in FIG. 2.

In one embodiment, the co-stimulatory domain is selected from the group consisting of CD28, 4-1BB, GITR, ICOS-1, CD27, OX-40 and DAP10. A preferred the co-stimulatory domain is CD28.

A preferred activating domain is CD3 zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or β chain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the BCMA-CAR. The nucleic acid encoding the CAR can be prepared from an amino acid sequence of the specified CAR by a conventional method. A base sequence encoding an amino acid sequence can be obtained from the aforementioned NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+en-vAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

The cell expressing the CAR can be used as a therapeutic agent for a disease. The therapeutic agent comprises the cell expressing the CAR as an active ingredient, and it may further comprise a suitable excipient.

The inventors have generated CAR-T cells based on humanized BCMA ScFv sequence specifically targeting BCMA. The inventors have produced humanized BCMA-CAR-T cells to target cancer cells overexpressing BCMA tumor antigen. The humanized BCMA-CAR-T cells of the present invention secreted high level of cytokines against multiple myeloma cancer cells and kill CHO-BCMA-positive target cells but not control parental CHO cells.

The advantages of the humanized BCMA-ScFv of the present invention over the corresponding mouse ScFv include less immunogenicity to human due to the humanized BCMA scFv sequence. Thus, the humanized BCMA antibody of the present invention is highly potent and advantageous as therapeutic agents in many clinical applications.

The present humanized BCMA ScFv can be used for immunotherapy applications: toxin/drug-conjugated antibody, monoclonal therapeutic antibody, and CAR-T cell immunotherapy.

Humanized BCMA-CAR-T cells using the present humanized BCMA ScFv effectively target BCMA antigen in BCMA-positive cancer cell lines such as ovarian, colon, pancreatic, melanoma, cervical cancer, and other BCMA-positive cancers.

Humanized BCMA-CAR-T cells can be used in combination with different chemotherapy: checkpoint inhibitors, targeted therapies, small molecule inhibitors, and antibodies.

Humanized BCMA-CAR-T cells can be used clinically for BCMA-positive cancer cells.

Modifications of co-activation domains such as CD28, 4-1BB and others can be used to increase the efficacy of CAR-T cells. Tag-conjugated humanized BCMA scFv can be used for CAR generation.

Humanized BCMA-CAR-T cells can be used with different safety switches such as t-EGFR, RQR (Rituximab-CD34-Rituximab), inducible caspase-9 and other.

Third generation CAR-T or other co-activation signaling domains can be used with humanized BCMA-scFv to prepare BCMA-CAR-T.

The humanized BCMA CAR can be combined with CARs targeting other tumor antigens or tumor microenvironment, e.g., VEGFR-1-3, PDL-1. Bi-specific antibodies against BCMA and CD3, or other antigens can be generated for therapy.

The humanized BCMA-CAR can be used for generating other types of cells such as CAR-natural killer (NK) cells, BCMA-CAR-macrophages, allogenic CAR-T cells, gene-edited T cells, and other BCMA-CAR hematopoietic cells, which can target BCMA-positive cancers.

The present invention provides T cells, NK cells, macrophages, or hematopoietic cells, modified to express BCMA-CAR.

BCMA-CAR-T cells can be used against cancer stem cells and circulating tumor stem cells that are most resistant against chemotherapy and form aggressive tumors.

BCMA-CAR-T cells, BCMA-NK cells, BCMA-macrophages, and other cells can be used for targeting different types of cancers.

BCMA-CAR-T cells can be delivered intra-tumorally to patients for increased safety.

The following examples further illustrate the present invention. These examples are intended merely to be illustrative of the present invention and are not to be construed as being limiting.

EXAMPLES

Example 1. Humanized BCMA VH and VL and scFv SEQUENCES

The BCMA scFv was derived from hybridoma clones 4C8A (WO2019/195017). The sequences of heavy and light chain variable regions of mouse clone 4C8A were determined and used to construct a humanized scFv.

The structure of humanized BCMA (PMC306) scFv is: $V_H$-linker-$V_L$. Linker is G4Sx3.

The bold highlights the nucleotide sequence of humanized BCMA PMC306 ScFv clone: $V_H$; the underlined highlights the nucleotide sequence of $V_L$; in between (italicized) is (SEQ ID NO: 2)
caggtgcagctggtgcagagcggcgcggaagtgaaaaaaccgggcagcag cgtgaaagtgagctgcaaagcgagcggctatacctttaccagctatgtga tgcattgggtgcgccaggcgccgggccagggcctggaatggatgggctat attattccgtataacgatgcgaccaaatataacgaaaaatttaaaggccg cgtgaccattaccgcggataaaagcaccagcaccgcgtatatggaactga gcagcctgcgcagcgaagataccgcggtgtattattgcgcgcgctataac tatgatggctattttgatgtgtggggccagggcaccctggtgaccgtgag cagc*ggcggcggcggcagcggcggcggcggcagcggcggcggcggcagcg* aaattgtgctgacccagagcccggcgaccctgagcctgagcccgggcgaa cgcgcgaccctgagctgccgcgcgagccagagcattagcgattatctgca ttggtatcagcagaaaccgggccaggcgccgcgcctgctgatttattatg cgagccagagcattaccggcattccggcgcgctttagcggcagcggcagc ggcaccgatttacccctgaccattagcagcctggaaccggaagattttgc -continued ggtgtattattgccagaacggccatagctttccgccgacctttggcggcg gcaccaaagtggaaattaaa PMC306 V$_H$ amino acid sequence:
(SEQ ID NO: 3)
QVQLVQSGAEVKKPGSSVKVSCKASGYTFTSYVMHWVRQAPGQGLEWMGY

IIPYNDATKYNEKFKGRVTITADKSTSTAYMELSSLRSEDTAVYYCARYN

YDGYFDVWGQGTLVTVSS

Linker amino acid sequence
(SEQ ID NO: 4)
GGGGSGGGGSGGGGS

PMC306 V$_L$ amino acid sequence:
(SEQ ID NO: 5)
EIVLTQSPATLSLSPGERATLSCRASQSISDYLHWYQQKPGQAPRLLIYY

ASQSITGIPARFSGSGSGTDFTLTISSLEPEDFAVYYCQNGHSFPPTFGG

GTKVEIK

Humanized BCMA (PMC306) scFv Protein:
(SEQ ID NO: 6)
Q V Q L V Q S G A E V K K P G S S V K V S C K A S

G Y T F T S Y V M H W V R Q A P G Q G L E W M G Y

I I P Y N D A T K Y N E K F K G R V T I T A D K S

T S T A Y M E L S S L R S E D T A V Y Y C A R Y N

Y D G Y F D V W G Q G T L V T V S S G G G G S G G

G G S G G G G S E I V L T Q S P A T L S L S P G E

R A T L S C R A S Q S I S D Y L H W Y Q Q K P G Q

A P R L L I Y Y A S Q S I T G I P A R F S G S G S

G T D F T L T I S S L E P E D F A V Y Y C Q N G H

S F P P T F G G G T K V E I K

Example 2. Humanized BCMA-CAR Sequences

Figure 3:
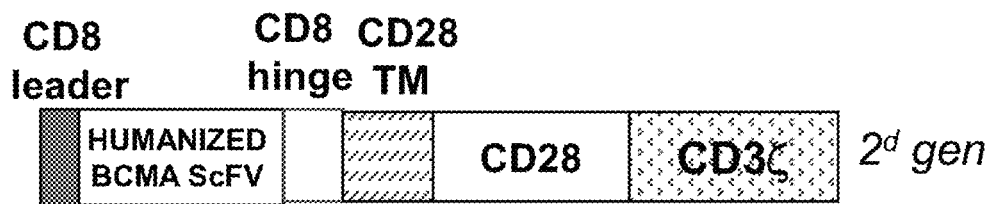
FIG. 3 shows the structure of humanized BCMA CAR construct.

The scheme of humanized (PMC306) BCMA-CAR construct is shown on FIG. 3. Lentiviral vector with EF1a promoter was used for cloning of humanized scFv CAR sequences.

The BCMA-CAR structure includes human CD8 signaling peptide, humanized BCMA scFv (V$_H$-Linker-V$_L$), CD8 hinge, CD28 transmembrane, activation domains CD3 zeta (FIG. 3).

The nucleotide sequences and some of the amino acid sequences of CD8 signaling-BCMA scFv (V$_H$-Linker-V$_L$)-CD8 hinge-CD28 TM-CD28-CD3-zeta are shown below.

<CD8 leader>
Nucleotide
(SEQ ID NO: 7)
ATGGCCTTACCAGTGACCGCCTTGCTCCTGCCGCTGGCCTTGCTGCTCC

ACGCCGCCAGGCCG

Amino Acid
(SEQ ID NO: 8)
MALPVTALLLPLALLLHAARP

<Nhe I site>
gctagc

<Humanized BCMA, PMC 306 scFv>
V$_H$-linker-V$_L$, see Example 1 for nucleic acid sequences and amino acid sequences.

<XhoI restriction site>
CTCGAG

<CD8 hinge>
Nucleotide
(SEQ ID NO: 9)
AAGCCCACCACGACGCCAGCGCCGCGACCACCAACACCGGCGCCCACCA

TCGCGTCGCAGCCCCTGTCCCTGCGCCCAGAGGCGAGCCGGCCAGCGGC

GGGGGGCGCAGTGCACACGAGGGGGCTGGACTTCGCCAGTGAT

Amino Acid
(SEQ ID NO: 10)
KPTTTPAPRPPTPAPTIASQPLSLRPEASRPAAGGAVHTRGLDFASD

<aagccc>

<CD28 transmembrane >
Nucleotide
(SEQ ID NO: 11)
TTTTGGGTGCTGGTGGTGGTTGGTGGAGTCCTGGCTTGCTATAGCTTGC

TAGTAACAGTGGCCTTTATTATTTTCTGGGTG

Amino Acid
(SEQ ID NO: 12)
FWVLVVVGGVLACYSLLVTVAFIIFWV

<CD28 co-stimulatory>
Nucleotide
(SEQ ID NO: 13)
AGGAGTAAGAGGAGCAGGCTCCTGCACAGTGACTACATGAACATGACTC

CCCGCCGCCCCGGGCCCACCCGCAAGCATTACCAGCCCTATGCCCCACC

ACGCGACTTCGCAGCCTATCGCTCC

Amino acid
(SEQ ID NO: 14)
RSKRSRLLHSDYMNMTPRRPGPTRKHYQPYAPPRDFAAYRS

<CD3 zeta> stop codons underlined
Nucleotide
(SEQ ID NO: 15)
AGAGTGAAGTTCAGCAGGAGCGCAGACGCCCCCGCGTACCAGCAGGGCC

AGAACCAGCTCTATAACGAGCTCAATCTAGGACGAAGAGAGGAGTACGA

TGTTTTGGACAAGAGACGTGGCCGGGACCCTGAGATGGGGGGAAAGCCG

CAGAGAAGGAAGAACCCTCAGGAAGGCCTGTACAATGAACTGCAGAAAG

ATAAGATGGCGGAGGCCTACAGTGAGATTGGGATGAAAGGCGAGCGCCG

GAGGGGCAAGGGGCACGATGGCCTTTACCAGGGTCTCAGTACAGCCACC

AAGGACACCTACGACGCCCTTCACATGCAGGCCCTGCCCCCTCGC<u>TAAt</u>

<u>ag</u>

Amino acid
(SEQ ID NO: 16)
RVKFSRSADAPAYQQGQNQLYNELNLGRREEYDVLDKRRGRDPEMGGKP

QRRKNPQEGLYNELQKDKMAEAYSEIGMKGERRRGKGHDGLYQGLSTAT

KDTYDALHMQALPPR

<EcoRI restriction site>
gaattc

Translated amino-acid sequence of humanized BCMA-CAR protein (SEQ ID NO: 17)
(SEQ ID NO: 17)
M A L P V T A L L L P L A L L L H A A R P A S Q V -continued

```
Q L V Q S G A E V K K P G S S V K V S C K A S G Y

T F T S Y V M H W V R Q A P G Q G L E W M G Y I I

P Y N D A T K Y N E K F K G R V T I T A D K S T S

T A Y M E L S S L R S E D T A V Y Y C A R Y N Y D

G Y F D V W G Q G T L V T V S S G G G G S G G G G

S G G G G S E I V L T Q S P A T L S L S P G E R A

T L S C R A S Q S I S D Y L H W Y Q Q K P G Q A P

R L L I Y Y A S Q S I T G I P A R F S G S G S G T

D F T L T I S S L E P E D F A V Y Y C Q N G H S F

P P T F G G G T K V E I K L E K P T T T P A P R P

P T P A P T I A S Q P L S L R P E A S R P A A G G

A V H T R G L D F A S D K P F W V L V V V G G V L

A C Y S L L V T V A F I I F W V R S K R S R L L H

S D Y M N M T P R R P G P T R K H Y Q P Y A P P R

D F A A Y R S R V K F S R S A D A P A Y Q Q G Q N

Q L Y N E L N L G R R E E Y D V L D K R R G R D P

E M G G K P Q R R K N P Q E G L Y N E L Q K D K M

A E A Y S E I G M K G E R R R G K G H D G L Y Q G

L S T A T K D T Y D A L H M Q A L P P R
```

Example 3. CAR Lentivirus Production

Lentivirus was produced by the standard procedure using 293T cells as described in [7] The inventors generated humanized BCMA-ScFv-CAR constructs inside lentiviral vector cloned into Xba I and Eco R I sites of lentiviral vector. pCD510-FMC63-28z lentiviral CAR construct containing the humanized BCMA ScFv-CD28-CD3zeta insert—between the Xba I and Eco RI cloning sites.

The lentiviruses were generated in 293T cells and the titers were established by RT-PCR. Then equal dose of lentiviruses was used for transduction of T cells.

Example 4. Peripheral Blood Mononuclear Cell (PBMC) Isolation from Whole Blood

Whole blood (Stanford Hospital Blood Center, Stanford, CA) was collected from individual or mixed donors (depending on the amount of blood required) in 10 mL Heparin vacutainers (Becton Dickinson). Approximately 10 ml of whole anti-coagulated blood was mixed with sterile phosphate buffered saline (PBS) buffer for a total volume of 20 ml in a 50 ml centrifuge tube (PBS, pH 7.4, without Ca+2 and Mg+2). The blood/PBS (20 ml) was layered on top of 15 mL of Ficoll-Paque PLUS (GE Healthcare) in a conical centrifuge tube gently, and the sample was centrifuged at 400×g for 30-40 min at room temperature. The layer of cells containing peripheral blood mononuclear cells (PBMC) at the diluted plasma/Ficoll interface was removed, washed, and centrifuged at 200×g for 10 min at room temperature. Cells were counted with a hemocytomter. The PBMC were washed once with CAR-T media (AIM V-AlbuMAX(BSA) (Life Technologies), with 5% AB serum and 1.25 µg/mL amphotericin B (Gemini Bioproducts, Woodland, CA), 100 U/mL penicillin, and 100 µg/mL streptomycin) and used for experiments or were frozen at −80° C.

Example 5. T-Cell Activation from PBMC

The isolated PBMC cells are resuspended in CAR-T medium with 300 U/mL huIL2 (from a 1000× stock; Invitrogen) and mixed with CD3-CD28 beads at a 1:1 bead-to-cell ratio. The cells are incubated at 37° C. in the presence of CO2 for 24 hours before viral transduction.

Example 6. T-Cell Transduction and Expansion

Following activation of PBMC, cells were incubated for 24 hours at 37° C., 5% $CO_2$. To each well of 1×10⁶ cells, 5×10⁶ lentivirus and 2 µL/mL of media of Transplus (Alstem, Richmond, CA) (a final dilution of 1:500) were added. Cells were incubated for an additional 24 hours before repeating the addition of virus. Cells were then grown in the continued presence of 300 U/ML of IL-2 fresh medium with IL-2 for a period of 12-14 days (total incubation time was dependent on the final umber of CAR-T cells required). Cells concentrations were analyzed every 2-3 days, with media being added at that time to dilute the cell suspension to 1×10⁶ cells/mL.

Example 7. Humanized BCMA-CAR-T Cells Expressed BCMA scFv

Figure 4:
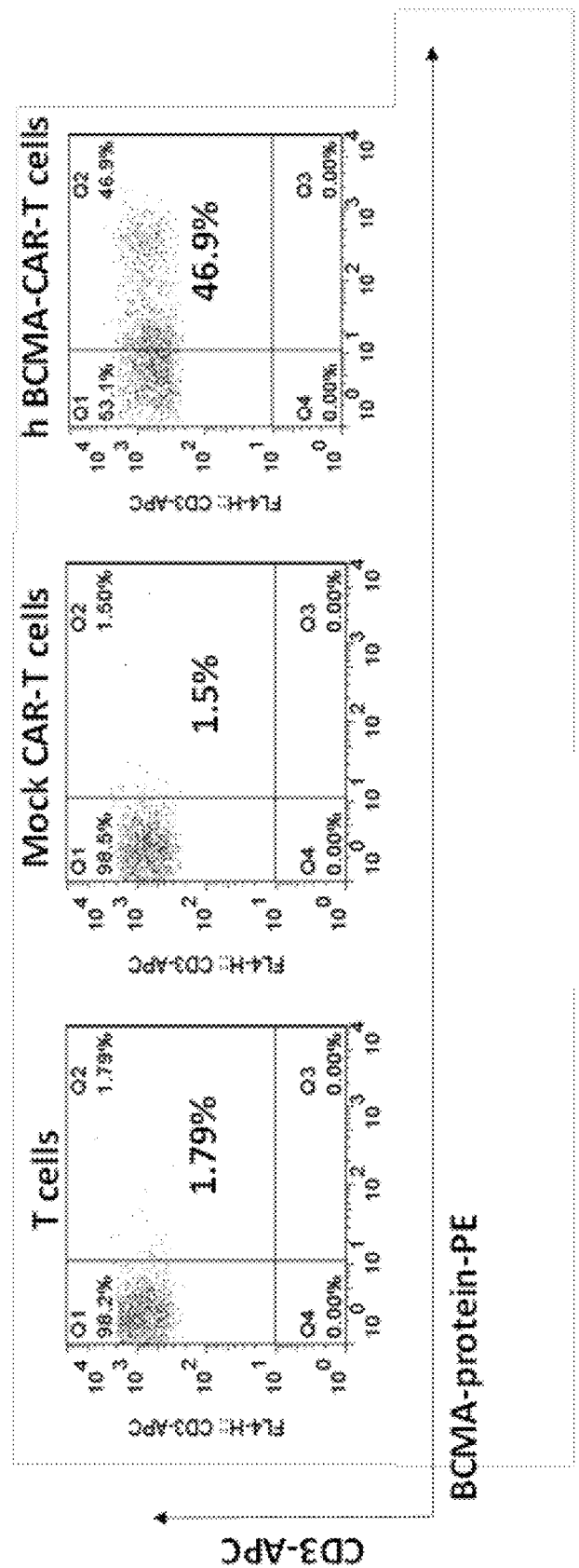
FIG. 4 shows that humanized BCMA-CAR construct was detected by FACS analysis with fluorescently labeled recombinant BCMA protein. Humanized BCMA-CAR-positive cells were detected after transduction of lentiviral humanized BCMA-CAR into T cells.

We designed humanized BCMA-CAR-T cells with humanized BCMA-CAR construct shown in Example 2. We used Mock scFv with unrelated ScFv and generated Mock-CAR-T cells as a negative control. Humanized BCMA-CAR-positive cells were detected after transduction of lentiviral humanized BCMA CAR into T cells. (FIG. 4).

Example 8. Humanized BCMA-CAR-T Cells Killed CHO-BCMA Cells but not CHO Cells

Figure 5A:
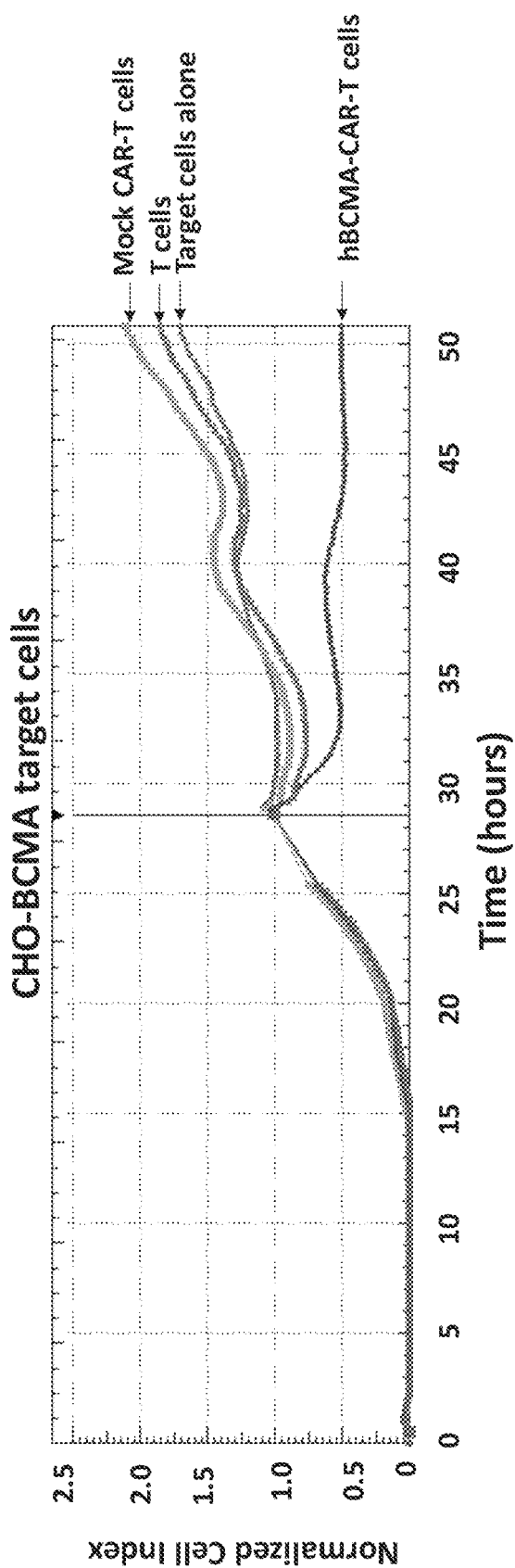
FIGS. 5A-5B show that humanized BCMA-CAR-T cells killed CHO-BCMA cells but not CHO cells. XCelligence Real-time cytotoxicity assay was used for detection of humanized BCMA-CAR-T cell cytotoxicity. Normalized cell index is shown on Y-axis, and time is shown on X-axis.
Figure 5B:
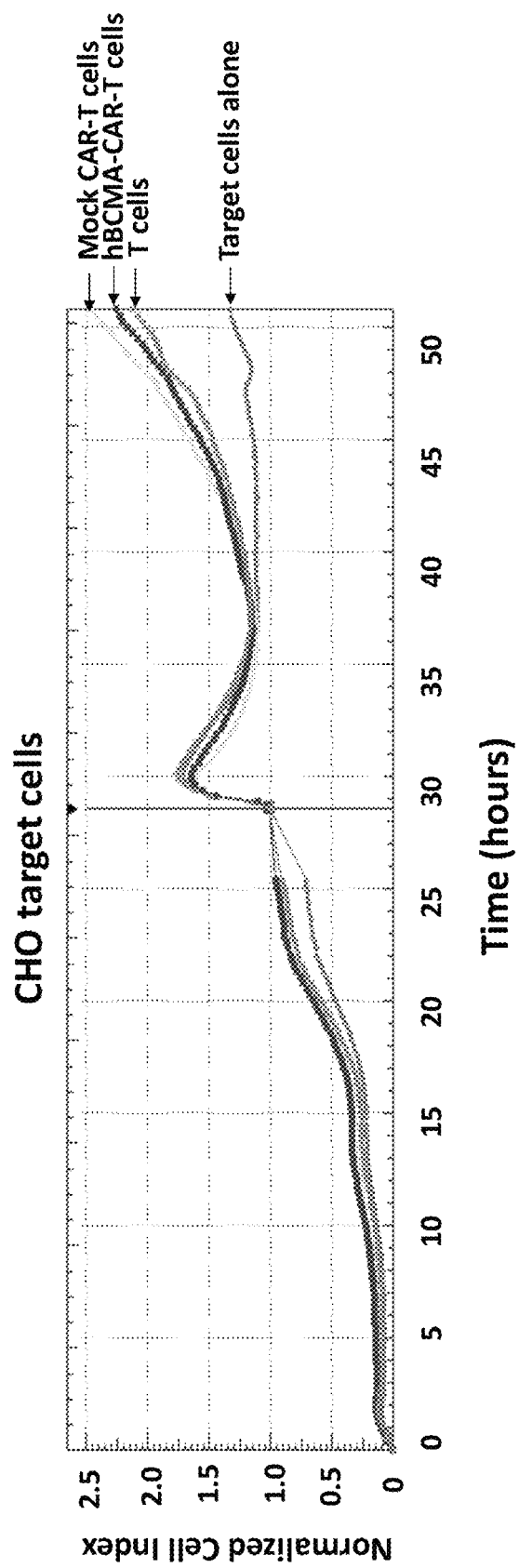

We incubated humanized BCMA-CAR-T cells with target CHO-BCMA target cells and CHO (BCMA-negative) control cells. Humanized BCMA-CAR-T cells specifically killed CHO-BCMA cells (FIG. 5A) but not CHO cells (FIG. 5B). The results demonstrate high specificity of humanized BCMA-CAR-T cells to target BCMA antigen and to kill BCMA-positive cells.

Figure 6:
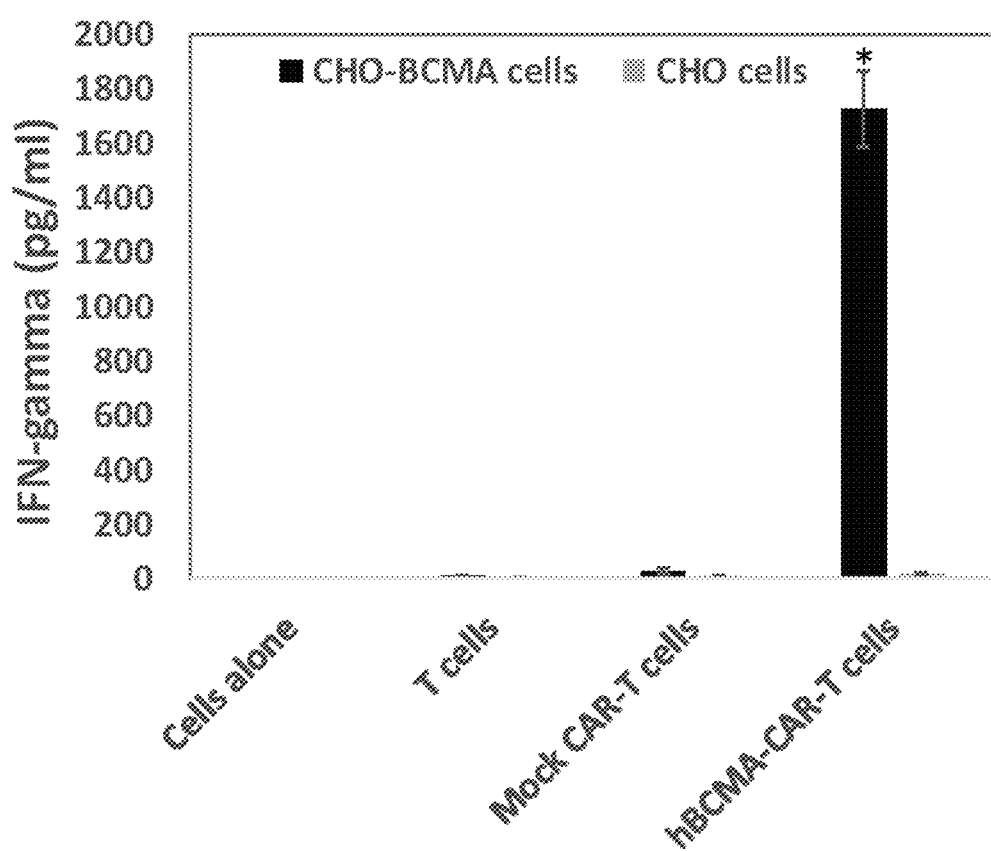
FIG. 6 shows that humanized BCMA-CAR-T cells, secreted high level of IFN-gamma with CHO-BCMA-positive cells, but not with BCMA-negative CHO control cells. $p<0.05$ IFN-gamma secretion in CHO-BCMA cells of BCMA-CAR-T cells versus T cells and Mock CAR-T cells.

Example 9. Humanized CAR-T Cells Secreted IFN-Gamma Against Target CHO-BCMA Cells Significantly but not Against CHO Cells We collected supernatant after co-incubation of humanized BCMA-CAR-T cells and target CHO-BCMA and parental CHO cells and performed IFN-gamma assay. BCMA-CAR-T cells secreted IFN-gamma with CHO-BCMA cells but not with negative control CHO cells (FIG. 6). The results confirm specificity of humanized BCMA-CAR-T cells.

Figure 7:
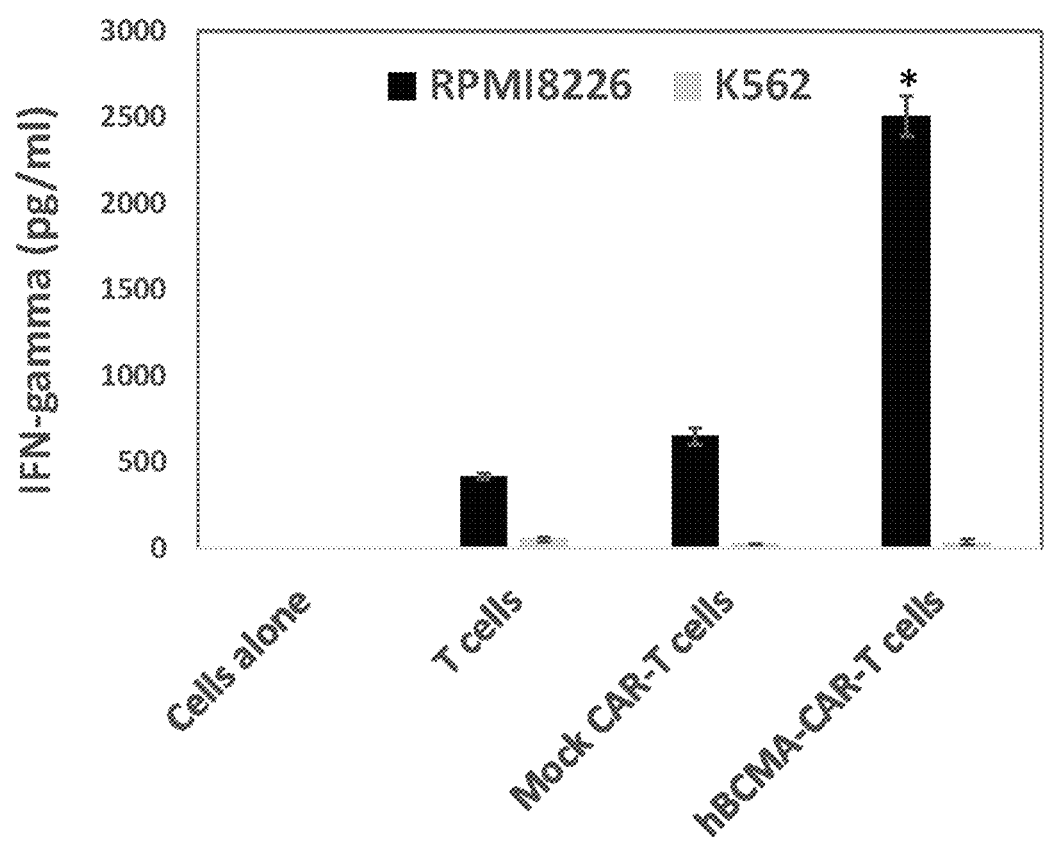
FIG. 7 shows humanized BCMA-CAR-T cells secreted high level of IFN-gamma against multiple myeloma cells but not against BCMA-negative K562 control cells. *$p<0.05$, IFN-gamma secretion in multiple myeloma cells of BCMA-CAR-T cells versus T cells and Mock-CAR-T cells.

Example 10. Humanized CAR-T Cells Secreted High Levels of IFN-Gamma Against BCMA-Positive RPMI8226 Multiple Myeloma Cells but not Against BCMA-Negative K562 Leukemia Cells We incubated BCMA-CAR-T cells with multiple myeloma cancer cells RPMI8266, and BCMA-negative K562 cells (chronic myelogenous leukemia cells) and performed ELISA with IFN-gamma using kit from Fisher, according to manufacturer's protocol. Humanized BCMA-CAR-T cells secreted high level of IFN-gamma against BCMA-positive multiple myeloma cancer cells but not against BCMA-negative K562 cells (FIG. 7). The level of killing and secretion of IFN-gamma was significantly higher with BCMA-CAR-T cells than with T cells and Mock CAR-T cells. This confirms specificity of humanized BCMA-CAR-T cells against hematological BCMA-positive cells.

Figure 8A:
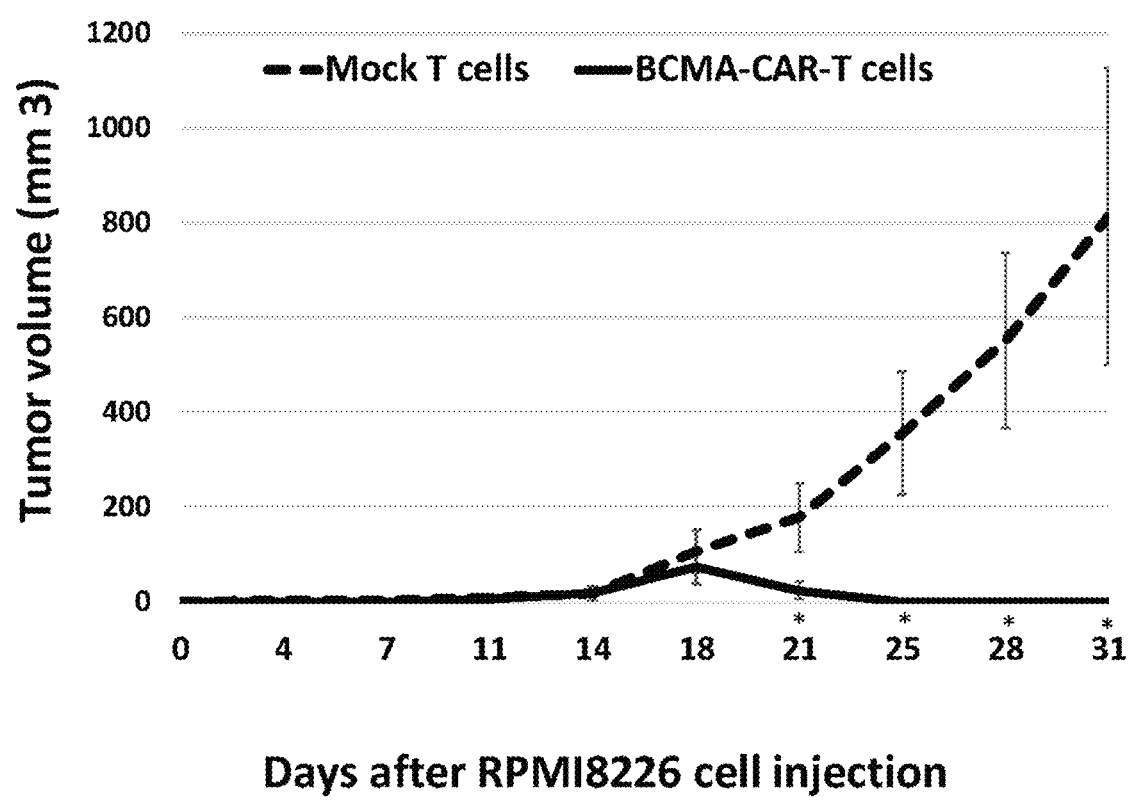
FIG. 8A shows humanized BCMA-CAR-T cells significantly decreased RPMI8226 xenograft tumor growth. CAR-T cells were injected at day 7 and 20 by i.v $1\times10^{\wedge}7$ cells/mice. Bars show average tumor volume+/−standard errors. *$p<0.05$, BCMA CAR-T cells vs Mock T cells.
Figure 8B:
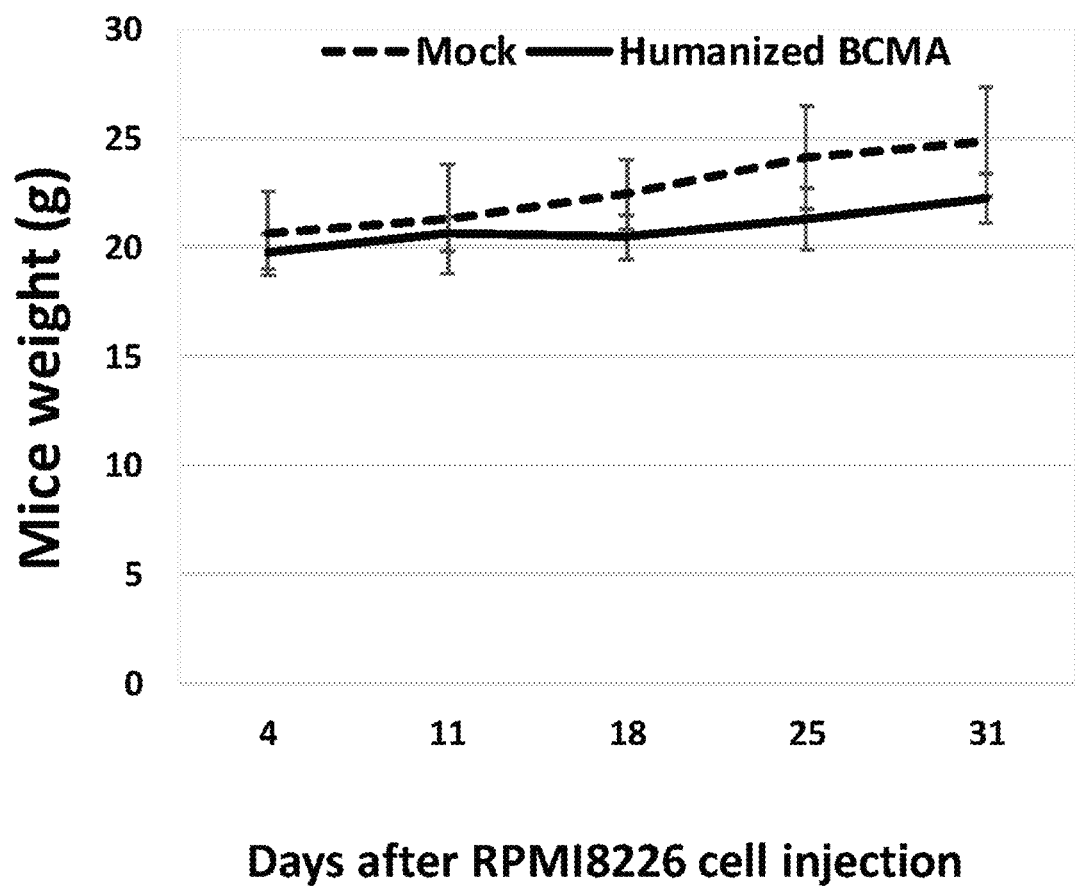
FIG. 8B shows that humanized BCMA-CAR-T cells did not decrease mouse body weight. Bars show average mice body weight+/−standard deviations.

Example 11. Humanized BCMA-CAR-T Cells Significantly Decreased RPMI8226 Xenograft Tumor Growth in Mouse Model In Vivo Multiple myeloma RPMI8226 cells were injected subcutaneously into NSG mice (1×10^7 cells/mice), and then humanized BCMA-CAR-T cells were injected twice by i.v. (1×10^7 CAR-T cells/mice). Humanized BCMA-CAR-T cells significantly decreased RPMI8226 tumor growth in mice (FIG. 8A). Mice treated with humanized BCMA-CAR-T cells did not cause decreased mice body weight suggesting that CAR-T cells were not toxic to mice (FIG. 8B). No behavior or visual changes were observed during the study.

Figure 8C:
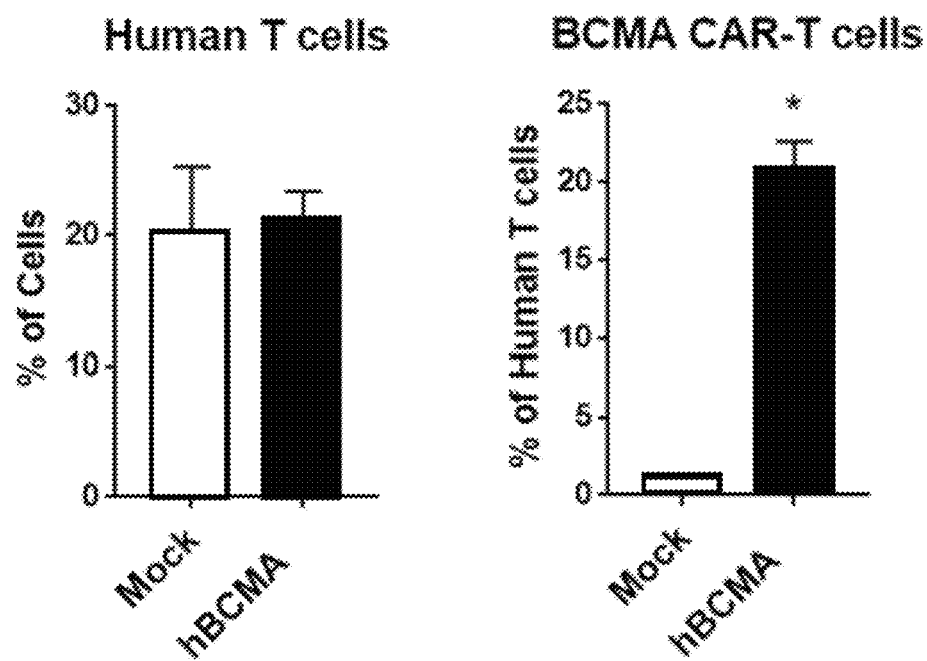
FIG. 8C shows that humanized BCMA-CAR-T cells, but not Mock-Car-T-cells, were detected in the mouse blood by FACS with BCMA recombinant protein. The peripheral blood cells were analyzed by flow cytometry at the end of the study for binding to human BCMA protein and antibodies specific for human T (CD4+/CD8+) cells. The percentage of cells binding to the CD4 antibody is shown on the left panel of FIG. 8C, and the percentage of those human T cells that also bound to the BCMA protein is shown on the right panel of FIG. 8C.

The peripheral blood cells were analyzed by flow cytometry at the end of the study for binding to human BCMA protein and antibodies specific for human T (CD4+/CD8+) cells. The percentage of cells binding to the CD4 mAb is shown on the left panel of FIG. 8C, and the percentage of those human T cells that also bound to the BCMA protein is shown on the right panel of FIG. 8C. The results show that humanized BCMA-CAR-T cells, but not Mock-Car-T-cells, were detected in the mouse blood by FACS with BCMA recombinant protein.

REFERENCES

1. Maus, M. V., Haas, A. R., Beatty, G. L., Albelda, S. M., Levine, B. L., Liu, X., Zhao, Y., Kalos, M., and June, C. H. (2013). T cells expressing chimeric antigen receptors can cause anaphylaxis in humans. Cancer Immunol Res 1, 26-31.
2. Maus, M. V., Grupp, S. A., Porter, D. L., and June, C. H. (2014). Antibody-modified T cells: CARs take the front seat for hematologic malignancies. Blood 123, 2625-2635.
3. Golubovskaya V, Wu L. (2016) Different Subsets of T Cells, Memory, Effector Functions, and CAR-T Immunotherapy. Cancers, 15, 8 (3). PMID: 26999211
4. Ali, S. A., Shi, V., Maric, I., Wang, M., Stroncek, D. F., Rose, J. J., Brudno, J. N., Stetler-Stevenson, M., Feldman, S. A., Hansen, B. G., et al. (2016). T cells expressing an anti-B-cell maturation antigen chimeric antigen receptor cause remissions of multiple myeloma. Blood 128, 1688-1700.
5. Tai, Y. T., and Anderson, K. C. (2015). Targeting B-cell maturation antigen in multiple myeloma. Immunotherapy. 7(11):1187-99. doi: 10.2217/imt.15.77. Epub 2015 Sep. 15. Review. PMID: 26370838
6. WO2019/195017
7. Berahovich R, Xu S, Zhou H, Harto H, Xu Q, Garcia A, Liu F, Golubovskaya V M, Wu L. FLAG-tagged CD19-specific CAR-T cells eliminate CD19-bearing solid tumor cells in vitro and in vivo. Front Biosci (Landmark Ed). 2017 Jun. 1; 22: 1644-1654

What is claimed is:

1. A method of activating immune response against BCMA-expressing tumor cells, the method comprising contacting the tumor cells with engineered immune cells expressing an anti-BCMA chimeric antigen receptor (CAR) having an anti-BCMA single-chain variable fragment (scFv) comprising:

a. a heavy chain variable region (VH) comprising the amino acid sequence of SEQ ID NO: 3, and a light chain variable region (VL) comprising the amino acid sequence of SEQ ID NO: 5;

b. a transmembrane domain selected from the group consisting of a T cell receptor α chain, a T cell receptor β chain, a CD3 zeta chain, a CD28, a CD38, a CD45, a CD4, a CD5, a CD8, a CD9, a CD16, a CD22, a CD33, a CD37, a CD64, a CD80, a CD86, a CD134, a CD137, an ICOS, a CD154, and a GITR;

c. a co-stimulatory domain selected from the group consisting of a CD28, a 4-1BB, a GITR, an ICOS-1, a CD27, an OX-40, and a DAP10; and d. a CD3zeta activating domain.

2. The method of claim 1, wherein activating immune response comprises one or more of release of cytotoxic cytokines and stimulating immune cells.

3. The method of claim 2, wherein stimulating immune cells comprises stimulating one or more of B cells, dendritic cells, NK cells, and macrophages.

4. The method of claim 1, wherein the engineered immune cells are selected from T cells, NK cells, macrophages, and hematopoietic cells.

5. The method of claim 1, wherein the BCMA-expressing tumor cells comprise one or more of tumor cells, cancer stem cells and circulating tumor stem cells.

6. The method of claim 1, wherein the transmembrane domain is a CD28 transmembrane domain, and the costimulatory domain is a 4-1BB costimulatory domain.

7. The method of claim 6, wherein the CD28 transmembrane domain comprises SEQ ID NO: 12.

8. The method of claim 6, wherein the CD28 transmembrane domain is encoded by a nucleic acid comprising SEQ ID NO: 11.

9. The method of claim 1, wherein the CD3zeta activating domain comprises SEQ ID NO: 16.

10. The method of claim 9, wherein the CD3zeta activating domain is encoded by a nucleic acid comprising SEQ ID NO: 15.

11. The method of claim 1, wherein the CAR further comprises a hinge domain.

12. The method of claim 11, wherein the hinge domain is a CD8 hinge domain.

13. The method of claim 12, wherein the CD8 hinge domain comprises SEQ ID NO: 10.

14. The method of claim 12, wherein the CD8 hinge domain is encoded by a nucleic acid comprising SEQ ID NO: 9.

15. The method of claim 1, wherein the CAR further comprises a leader sequence.

16. The method of claim 15, wherein the leader sequence is a CD8 leader sequence.

17. The method of claim 16, wherein the CD8 leader sequence comprises SEQ ID NO: 8.

18. The method of claim 16, wherein the CD8 leader sequence is encoded by a nucleic acid comprising SEQ ID NO: 7.

* * * * *

```
SEQUENCE LISTING

Sequence total quantity: 17
SEQ ID NO: 1              moltype = AA  length = 184
FEATURE                   Location/Qualifiers
source                    1..184
                          mol_type = protein
                          organism = Homo sapiens
SEQUENCE: 1
MLQMAGQCSQ NEYFDSLLHA CIPCQLRCSS NTPPLTCQRY CNASVTNSVK GTNAILWTCL   60
GLSLIISLAV FVLMFLLRKI NSEPLKDEFK NTGSGLLGMA NIDLEKSRTG DEIILPRGLE  120
YTVEECTCED CIKSKPKVDS DHCFPLPAME EGATILVTTK TNDYCKSLPA ALSATEIEKS  180
ISAR                                                              184

SEQ ID NO: 2              moltype = DNA  length = 720
FEATURE                   Location/Qualifiers
source                    1..720
                          mol_type = genomic DNA
                          organism = Homo sapiens
SEQUENCE: 2
caggtgcagc tggtgcagag cggcgcggaa gtgaaaaaac cgggcagcag cgtgaaagtg   60
agctgcaaag cgagcggcta tacctttacc agctatgtga tgcattgggt gcgccaggcg  120
ccgggccagg gcctggaatg gatgggctat attattccgt ataacgatgc gaccaaatat  180
aacgaaaaat ttaaaggccg cgtgaccatt accgcggata aaagcaccag caccgcgtat  240
atggaactga gcagcctgcg cagcgaagat accgcggtgt attattgcgc gcgctataac  300
tatgatggct attttgatgt gtggggccag ggcaccctgg tgaccgtgag cagcggcggc  360
ggcggcagcg gcggcggcgg cagcggcggc ggcggcagcg aaattgtgct gacccagagc  420
ccggcgaccc tgagcctgag cccgggcgaa cgcgcgaccc tgagctgccg cgcgagccag  480
agcattagcg attatctgca ttggtatcag cagaaaccgg gccagcgcgc gccgcctgctg  540
atttattatg cgagccagag cattaccggc attccgcgcg cgtttagcgg cagcggcagc  600
ggcaccgatt ttaccctgac cattagcagc ctggaaccgg aagattttgc ggtgtattat  660
tgccagaacg gccatagctt tccgccgacc tttggcggcg gcaccaaagt ggaaattaaa  720

SEQ ID NO: 3              moltype = AA  length = 118
FEATURE                   Location/Qualifiers
source                    1..118
                          mol_type = protein
```

```
                        organism = Homo sapiens
SEQUENCE: 3
QVQLVQSGAE VKKPGSSVKV SCKASGYTFT SYVMHWVRQA PGQGLEWMGY IIPYNDATKY      60
NEKFKGRVTI TADKSTSTAY MELSSLRSED TAVYYCARYN YDGYFDVWGQ GTLVTVSS       118

SEQ ID NO: 4            moltype = AA   length = 15
FEATURE                 Location/Qualifiers
REGION                  1..15
                        note = synthetic
source                  1..15
                        mol_type = protein
                        organism = synthetic construct
SEQUENCE: 4
GGGGSGGGGS GGGGS                                                       15

SEQ ID NO: 5            moltype = AA   length = 107
FEATURE                 Location/Qualifiers
source                  1..107
                        mol_type = protein
                        organism = Homo sapiens
SEQUENCE: 5
EIVLTQSPAT LSLSPGERAT LSCRASQSIS DYLHWYQQKP GQAPRLLIYY ASQSITGIPA      60
RFSGSGSGTD FTLTISSLEP EDFAVYYCQN GHSFPPTFGG GTKVEIK                   107

SEQ ID NO: 6            moltype = AA   length = 240
FEATURE                 Location/Qualifiers
source                  1..240
                        mol_type = protein
                        organism = Homo sapiens
SEQUENCE: 6
QVQLVQSGAE VKKPGSSVKV SCKASGYTFT SYVMHWVRQA PGQGLEWMGY IIPYNDATKY      60
NEKFKGRVTI TADKSTSTAY MELSSLRSED TAVYYCARYN YDGYFDVWGQ GTLVTVSSGG     120
GGSGGGGSGG GGSEIVLTQS PATLSLSPGE RATLSCRASQ SISDYLHWYQ QKPGQAPRLL     180
IYYASQSITG IPARFSGSGS GTDFTLTISS LEPEDFAVYY CQNGHSFPPT FGGGTKVEIK     240

SEQ ID NO: 7            moltype = DNA   length = 63
FEATURE                 Location/Qualifiers
source                  1..63
                        mol_type = genomic DNA
                        organism = Homo sapiens
SEQUENCE: 7
atggccttac cagtgaccgc cttgctcctg ccgctggcct tgctgctcca cgccgccagg      60
ccg                                                                    63

SEQ ID NO: 8            moltype = AA   length = 21
FEATURE                 Location/Qualifiers
source                  1..21
                        mol_type = protein
                        organism = Homo sapiens
SEQUENCE: 8
MALPVTALLL PLALLLHAAR P                                                21

SEQ ID NO: 9            moltype = DNA   length = 141
FEATURE                 Location/Qualifiers
source                  1..141
                        mol_type = genomic DNA
                        organism = Homo sapiens
SEQUENCE: 9
aagcccacca cgacgccagc gccgcgacca ccaacaccgg cgcccaccat cgcgtcgcag      60
cccctgtccc tgcgcccaga ggcgagccgg ccagcggcgg ggggcgcagt gcacacgagg     120
gggctggact cgccagtga t                                                141

SEQ ID NO: 10           moltype = AA   length = 47
FEATURE                 Location/Qualifiers
source                  1..47
                        mol_type = protein
                        organism = Homo sapiens
SEQUENCE: 10
KPTTTPAPRP PTPAPTIASQ PLSLRPEASR PAAGGAVHTR GLDFASD                    47

SEQ ID NO: 11           moltype = DNA   length = 81
FEATURE                 Location/Qualifiers
source                  1..81
                        mol_type = genomic DNA
                        organism = Homo sapiens
SEQUENCE: 11
ttttgggtgc tggtggtggt tggtggagtc ctggcttgct atagcttgct agtaacagtg      60
gcctttatta ttttctgggt g                                                81
```

```
SEQ ID NO: 12              moltype = AA   length = 27
FEATURE                    Location/Qualifiers
source                     1..27
                           mol_type = protein
                           organism = Homo sapiens
SEQUENCE: 12
FWVLVVVGGV LACYSLLVTV AFIIFWV                                        27

SEQ ID NO: 13              moltype = DNA   length = 123
FEATURE                    Location/Qualifiers
source                     1..123
                           mol_type = genomic DNA
                           organism = Homo sapiens
SEQUENCE: 13
aggagtaaga ggagcaggct cctgcacagt gactacatga acatgactcc ccgccgcccc    60
gggcccaccc gcaagcatta ccagcccat gccccaccac gcgacttcgc agcctatcgc   120
tcc                                                                 123

SEQ ID NO: 14              moltype = AA   length = 41
FEATURE                    Location/Qualifiers
source                     1..41
                           mol_type = protein
                           organism = Homo sapiens
SEQUENCE: 14
RSKRSRLLHS DYMNMTPRRP GPTRKHYQPY APPRDFAAYR S                        41

SEQ ID NO: 15              moltype = DNA   length = 345
FEATURE                    Location/Qualifiers
source                     1..345
                           mol_type = genomic DNA
                           organism = Homo sapiens
SEQUENCE: 15
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgcag agaaggaaga acccctcagga aggcctgtac  180
aatgaactgc agaaagataa gatggcggag gcctacagtg agattgggat gaaaggcgag   240
cgccggaggg gcaaggggca cgatggcctt taccagggtc tcagtacagc caccaaggac   300
acctacgacg cccttcacat gcaggccctg cccctcgct aatag                    345

SEQ ID NO: 16              moltype = AA   length = 113
FEATURE                    Location/Qualifiers
source                     1..113
                           mol_type = protein
                           organism = Homo sapiens
SEQUENCE: 16
RVKFSRSADA PAYQQGQNQL YNELNLGRRE EYDVLDKRRG RDPEMGGKPQ RRKNPQEGLY    60
NELQKDKMAE AYSEIGMKGE RRRGKGHDGL YQGLSTATKD TYDALHMQAL PPR          113

SEQ ID NO: 17              moltype = AA   length = 495
FEATURE                    Location/Qualifiers
source                     1..495
                           mol_type = protein
                           organism = Homo sapiens
SEQUENCE: 17
MALPVTALLL PLALLLHAAR PASQVQLVQS GAEVKKPGSS VKVSCKASGY TFTSYVMHWV    60
RQAPGQGLEW MGYIIPYNDA TKYNEKFKGR VTITADKSTS TAYMELSSLR SEDTAVYYCA   120
RYNYDGYFDV WGQGTLVTVS SGGGGSGGGG SGGGGSEIVL TQSPATLSLS PGERATLSCR   180
ASQSISDYLH WYQQKPGQAP RLLIYYASQS ITGIPARFSG SGSGTDFTLT ISSLEPEDFA   240
VYYCQNGHSF PPTFGGGTKV EIKLEKPTTT PAPRPPTPAP TIASQPLSLR PEASRPAAGG   300
AVHTRGLDFA SDKPFWVLVV VGGVLACYSL LVTVAFIIFW VRSKRSRLLH SDYMNMTPRR   360
PGPTRKHYQP YAPPRDFAAY RSRVKFSRSA DAPAYQQGQN QLYNELNLGR REEYDVLDKR   420
RGRDPEMGGK PQRRKNPQEG LYNELQKDKM AEAYSEIGMK GERRRGKGHD GLYQGLSTAT   480
KDTYDALHMQ ALPPR                                                   495
```